J. S. ULFERS.
TRACTION WHEEL.
APPLICATION FILED DEC. 13, 1910.
991,396.
Patented May 2, 1911.
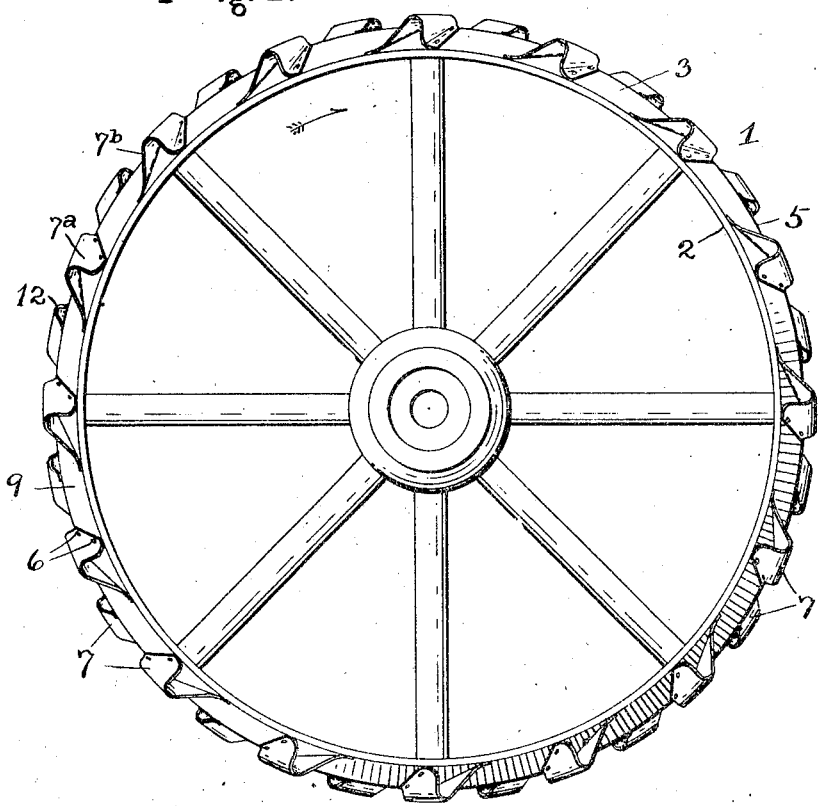
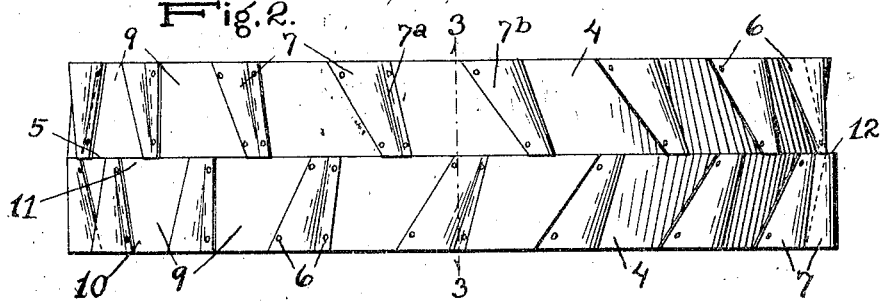
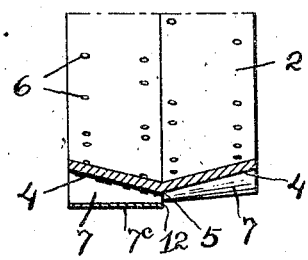
Witnesses
Stuart Hilder.
Francis W. Anderson.
Inventor
J. S. Ulfers
by E. W. Anderson
his Attorneys

UNITED STATES PATENT OFFICE.

JACOB S. ULFERS, OF BEACH, NORTH DAKOTA.

TRACTION-WHEEL.

991,396.     Specification of Letters Patent.     Patented May 2, 1911.

Application filed December 13, 1910. Serial No. 597,172.

*To all whom it may concern:*

Be it known that I, JACOB S. ULFERS, a citizen of the United States, resident of Beach, in the county of Billings and State of North Dakota, have made a certain new and useful Invention in Traction-Wheels; and I declare the following to be a full, clear, and exact description of the same, such as will enable others skilled in the art to which it appertains to make and use the invention, reference being had to the accompanying drawings, and to letters or figures of reference marked thereon, which form a part of this specification.

Figure 1 is a side view of my traction wheel. Fig. 2 is a plan view of the same. Fig. 3 is a section on the line 3—3, Fig. 2 with parts broken away.

The invention has relation to an improved self-cleaning traction wheel for use with harvesters, road engines and the like, and it consists in the novel construction and combinations of parts, as hereinafter set forth.

In the accompanying drawings, illustrating the invention, the numeral 1 designates my traction wheel, which is provided with a felly 2 having an outer circumferential surface 3 composed of oppositely inclined or sloping annular surfaces 4, 4, meeting at the center in a comparatively sharp ridge 5, dividing such surfaces. Secured to this felly by rivets 6 or in other suitable manner are double annular series of hollow teeth 7, 7, which project above the outer circumferential surface of the felly at their inner as well as their outer ends and throughout their length, the members of the two series having a staggered relation, as shown, and each tooth having its longitudinal axis inclined forward. The teeth are hollow and tapered as shown, being larger at their outer than at their inner ends, whereby the tops 7° of the teeth are made horizontal. The adjacent teeth of each series are separated from each other by tapered intervals 9, 9, the bottoms of said intervals being wider at their inner than at their outer ends, and the side walls of said intervals formed by the tapered or converging sides 7ª, 7ᵇ, of the teeth having the effect of making the outer ends 10 of the intervals larger in area than their inner ends 11, owing to the increasing height of the teeth toward their outer ends. The forward side walls 7ª of the teeth are made approximately vertical, the rear side walls 7ᵇ thereof being considerably inclined, whereby the teeth have the general formation of ratchet teeth, with the tops 7° of rounded angular formation.

Owing to the staggered arrangement of the teeth of the two series upon the oppositely inclined halves of the felly, the inner ends 12 of the hollow teeth of one series open into the intervals or spaces between the hollow teeth of the other series.

In the operation of my wheel, the inner ends of the teeth of the two series will first strike into the ground, which is effectively gripped owing to the ratchet formation of the teeth. In muddy or moist ground, the mud will be automatically squeezed or forced from the inner ends of the intervals between the teeth toward and out of the larger ends of said intervals, the mud also passing out within the hollow teeth of increasing size toward their outer ends. Thus the wheel is self-cleaning and will not accumulate mud or dirt, to interfere with its proper action. Owing to the comparatively sharp ridge or edge in which the inclined surfaces of the felly meet at the center of the wheel, there can be no accumulation of dirt at such juncture.

Having thus described my invention, what I claim as new and desire to secure by Letters Patent is:

1. A traction wheel having a felly provided with oppositely inclined outer circumferential surfaces having a comparatively sharp juncture, and a double series of hollow teeth having outward projection beyond said felly surfaces throughout their entire length, the forward walls of said teeth being approximately vertical and the rear walls thereof inclined.

2. A traction wheel having a felly provided with oppositely inclined outer circumferential surfaces and a double series of hollow teeth having outward projection beyond said felly throughout their entire length, said teeth being of increasing size from their inner toward their outer ends, having converging side walls and intervals of increasing area from their inner toward their outer ends between the teeth of each series, the teeth of the two series having a staggered arrangement whereby the inner ends of the teeth of one series open into the intervals between the teeth of the other series.

3. A traction wheel having a felly provided with oppositely inclined outer circumferential surfaces having a comparatively sharp juncture, and a double series of hollow ratchet-form inclined teeth having outward projection beyond said felly surfaces throughout their entire length, said teeth being of increasing size from their inner toward their outer ends, having converging side walls and intervals of increasing area from their inner toward their outer ends between the teeth of each series, the teeth of the two series having a staggered arrangement whereby the inner ends of the hollow teeth of one series open into the intervals between the teeth of the other series.

In testimony whereof I affix my signature, in presence of two witnesses.

JACOB S. ULFERS.

Witnesses:
R. E. MORROW,
G. D. LOVELL.